United States Patent
Gipson

(10) Patent No.: US 7,318,698 B1
(45) Date of Patent: Jan. 15, 2008

(54) LIFT/TRANSPORTER FOR SMALL VEHICLE

(76) Inventor: Roy Gipson, 7222 SW. Arnold Rd., Plattsburg, MO (US) 64477

( * ) Notice: Subject to any disclaimer, the term of this patent is extended or adjusted under 35 U.S.C. 154(b) by 89 days.

(21) Appl. No.: 11/429,597

(22) Filed: May 8, 2006

(51) Int. Cl.
*B60P 3/12* (2006.01)

(52) U.S. Cl. ............... 414/563; 280/402; 280/461.1; 414/800

(58) Field of Classification Search .......... 414/428, 414/563, 703; 280/402, 406.1, 461.1
See application file for complete search history.

(56) References Cited

U.S. PATENT DOCUMENTS

| | | | |
|---|---|---|---|
| 2,183,478 A * | 12/1939 | Holmes et al. | 414/563 |
| 2,709,604 A * | 5/1955 | Hartman | 280/406.1 |
| 3,285,443 A * | 11/1966 | Gaumont | 414/563 |
| 3,434,607 A * | 3/1969 | Nelson | 414/563 |
| 3,434,608 A * | 3/1969 | Nelson | 414/563 |
| 4,067,471 A * | 1/1978 | Roatcap | 414/703 |
| 4,534,579 A | 8/1985 | Shackelford, Sr. | |
| 4,573,857 A | 3/1986 | Porter, Sr. et al. | |
| 4,632,629 A | 12/1986 | Kooima | |
| 4,679,978 A | 7/1987 | Holmes et al. | |
| 4,737,066 A | 4/1988 | Allison, Jr. | |
| 4,797,057 A * | 1/1989 | Shoup et al. | 414/563 |
| 4,836,737 A | 6/1989 | Holmes et al. | |
| 4,949,987 A * | 8/1990 | Gallatin | 280/459 |
| 4,958,980 A | 9/1990 | Holmes et al. | |
| 4,993,909 A | 2/1991 | Hamman | |
| 5,391,044 A | 2/1995 | Young | |
| 6,164,895 A * | 12/2000 | Croswell | 414/462 |
| 6,579,055 B1 * | 6/2003 | Williams | 414/462 |
| 7,137,643 B1 * | 11/2006 | Hsueh | 280/455.1 |
| 2001/0014272 A1 * | 8/2001 | Ochoa et al. | 414/462 |
| 2001/0026756 A1 * | 10/2001 | Mortimore | 414/556 |

* cited by examiner

*Primary Examiner*—James Keenan
(74) *Attorney, Agent, or Firm*—Donald R Schoonover

(57) ABSTRACT

A tow lift apparatus for a towing vehicle includes a pair of vertically aligned and horizontally and fore-to aft oriented receiver hitches fixedly secured to the rear of the towing vehicle; a lift releasably connected to the receiver hitches, the lift connected to a power source for displacing the tow lift apparatus to and from a loading configuration and a transporting configuration; a connecting mechanism including first and second cradle with a securing device for releasable connection to a vehicle to be towed. The tow lift apparatus is adjustable to accommodate vehicles having different wheel sizes and different wheel widths. A method of assembling and using the tow lift apparatus is provided.

18 Claims, 7 Drawing Sheets

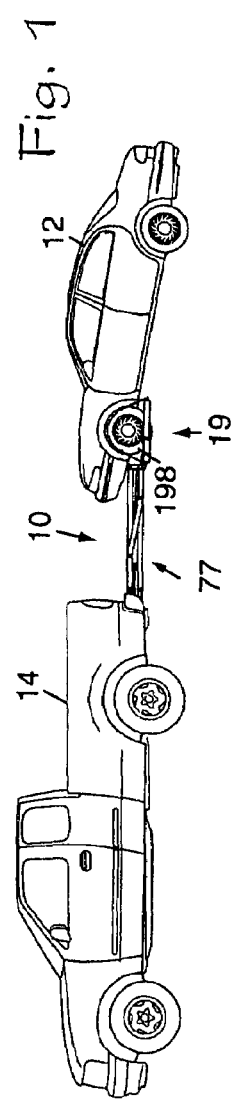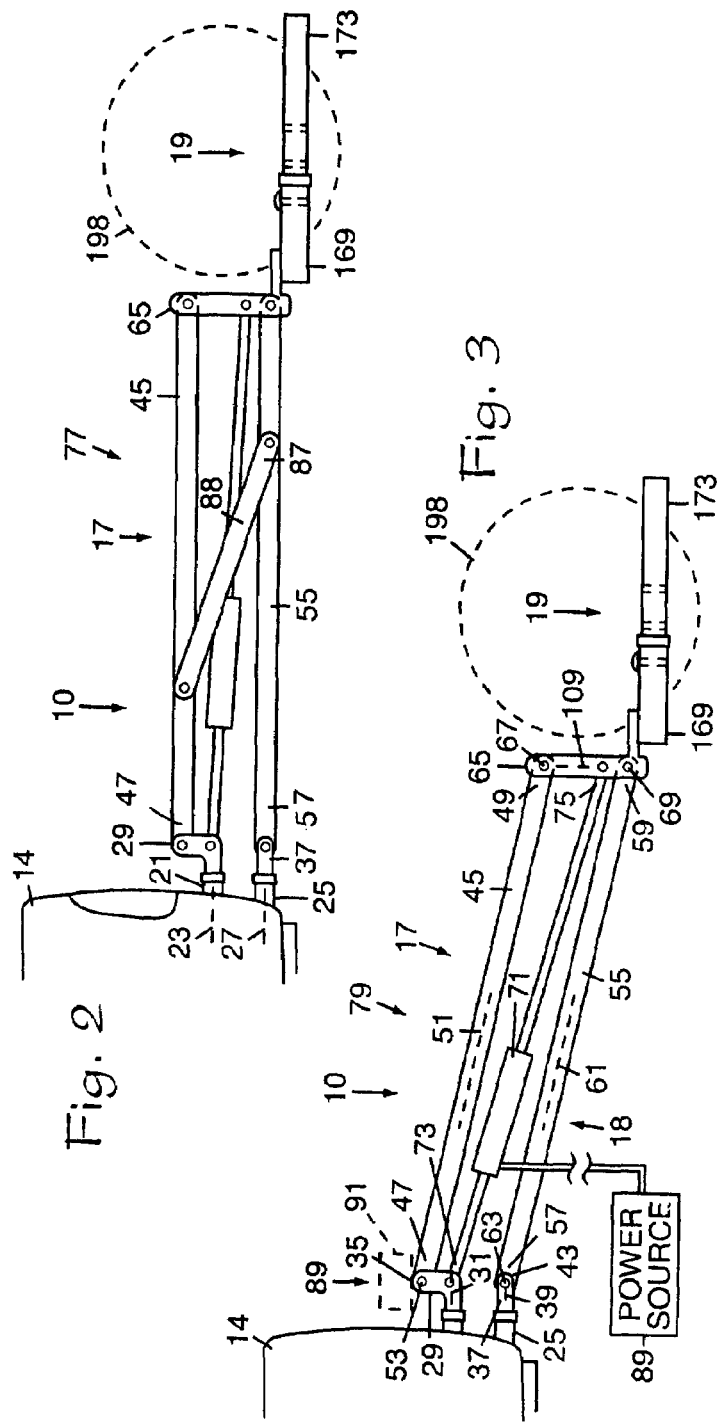

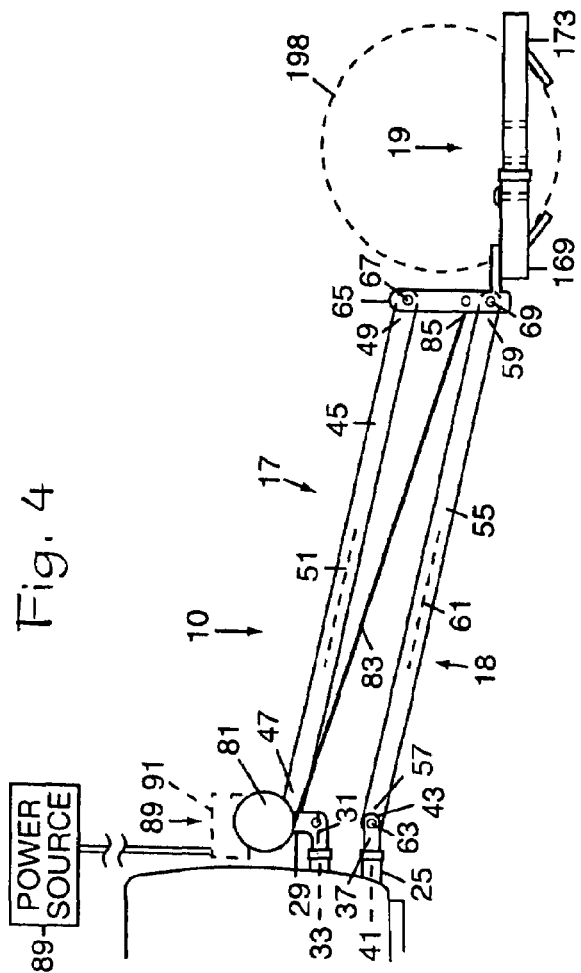
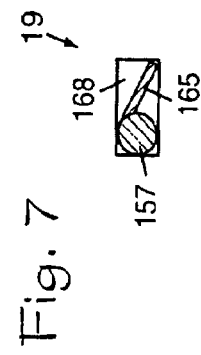
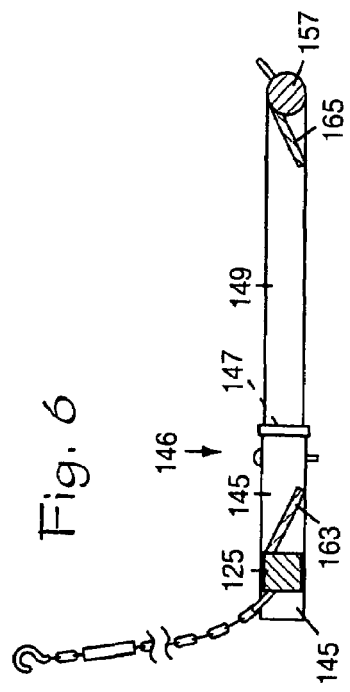

| A METHOD OF ASSEMBLING A TOW LIFT APPARATUS, COMPRISING THE STEPS OF: |
|---|

↓ ╱201

| PROVIDING A TOW LIFT APPARATUS HAVING SEPARATED PARTS AS FOLLOWS: FIRST AND SECOND RECEIVER HITCHES; FIRST AND SECOND CONNECTING ELEMENTS; LIFT MEANS HAVING UPPER AND LOWER ARMS, POWER MEANS, AND A LIFT END ELEMENT, A CROSSBAR ELEMENT HAVING A BASE ELEMENT WITH FIRST AND SECOND CONNECTING ENDS; A LOCKING MECHANISM FOR POSITIVELY LOCKING THE TOW LIFT APPARATUS IN A TRANSPORTING CONFIGURATION; FIRST AND SECOND END ELEMENTS HAVING FIRST AND SECOND CONNECTING DEVICES AND FIRST AND SECOND FRONT WHEEL SUPPORTS FIXEDLY SECURED TO RESPECTIVE DISTAL ENDS THEREOF; FIRST AND SECOND REARWARDLY-EXTENDING ELEMENTS HAVING FIRST AND SECOND TRANSVERSE SUPPORT ELEMENTS, FIRST AND SECOND REAR WHEEL SUPPORTS, AND FIRST AND SECOND TOE ELEMENTS FIXEDLY SECURED TO RESPECTIVE DISTAL ENDS THEREOF; AND SECURING MEANS |
|---|

↓ ╱203

| FIXEDLY SECURING THE FIRST AND SECOND RECEIVER HITCHES TO THE REAR END OF A TOWING VEHICLE WHEREIN AXES THEREOF ARE ALIGNED VERTICALLY FROM EACH OTHER AND ARE ORIENTED HORIZONTALLY AND FORE-TO-AFT RELATIVE TO THE TOWING VEHICLE |
|---|

↓ ╱205

| SECURING THE LIFT MEANS TO THE FIRST AND SECOND CONNECTING ELEMENTS |
|---|

↓ ╱207

| RELEASABLY SECURING THE FIRST AND SECOND CONNECTING ELEMENTS TO THE FIRST AND SECOND RECEIVER HITCHES |
|---|

↓ ╱209

| CONNECTING THE POWER MEANS TO A POWER SOURCE |
|---|

↓

| FIG. 9B. |
|---|

FIG. 9A.

LIFT/TRANSPORTER FOR SMALL VEHICLE

BACKGROUND OF THE INVENTION

1. Field of the Invention

The present invention relates to accessories for motor vehicles and, more specifically without limitation, to accessories for transporting small vehicles.

2. Description of the Related Art

It is not unusual for a vehicle to become inoperable due to mechanical or electrical problems to the extent that the vehicle must be towed to a location where it can be serviced. If the breakdown occurs reasonably close to a populated area, it is generally a simple matter for the stranded party to telephone a wrecker service to obtain the necessary towing service.

It is also not unusual to use vehicles for off road entertainment and competition. Because such vehicles are sometimes subjected to extremely rough terrain and severe driving conditions, breakdowns become considerably more common. Unfortunately, such breakdowns may occur at remote locations where wreckers are not available, or if they are available, the length of time required and the expense incurred to obtain the wrecker towing services may be considerably less than desirable.

What is needed is a tow lift apparatus that can be installed on another vehicle for towing a vehicle that needs to be towed; that is portable and reasonably lightweight; that can be easily provided, assembled, installed on a towing vehicle, and used even at a remote, unpopulated area; that is removably installable on the towing vehicle; and that can be easily disassembled for storage or portability purposes.

PRINCIPAL OBJECTS AND ADVANTAGES OF THE INVENTION

The principal objects and advantages of the present invention include: providing a tow lift apparatus that can be installed on another vehicle for towing a vehicle that needs to be towed; providing such a tow lift apparatus that is portable and reasonably lightweight; providing such a tow lift apparatus that can be easily provided, assembled, installed on a towing vehicle, and used even at a remote, unpopulated area; providing such a tow lift apparatus that is removably installable on the towing vehicle; providing such a tow lift apparatus that can be easily disassembled for storage or portability purposes; and generally providing such a tow lift apparatus that is reliable in performance, capable of long-lasting life, and is particularly well adapted for the proposed usages thereof.

Other objects and advantages of this invention will become apparent from the following description taken in conjunction with the accompanying drawings wherein are set forth, by way of illustration and example, certain embodiments of this invention.

SUMMARY OF THE INVENTION

The improvements of the present invention for a tow lift apparatus for towing a vehicle to be towed behind a towing vehicle include lift means, a connecting mechanism, and securing means.

The lift means includes a first receiver hitch having a fore-to-aft and horizontally oriented longitudinal axis, the first receiver hitch being fixedly secured to the towing vehicle at a rear end thereof; a second receiver hitch having a fore-to-aft and horizontally oriented longitudinal axis, the second receiver hitch being fixedly secured to the towing vehicle at the rear end thereof and spaced vertically below the first receiver hitch; a first connecting element having a longitudinal axis, a proximal end, and a distal end; the proximal end of the first connecting element being slidably and telescopically receivable by the first receiver hitch wherein the longitudinal axis of the first connecting element coincides with the longitudinal axis of the first receiver hitch; a second connecting element having a longitudinal axis, a proximal end, and a distal end; the distal end of the second connecting element being slidably and telescopically receivable by the second receiver hitch wherein the longitudinal axis of the second connecting element coincides with the longitudinal axis of the second receiver hitch; an upper arm having a proximal end, a distal end, and a longitudinal axis; the proximal end of the upper arm being pivotally connected to the distal end of the first connecting element to pivot about a transversely and horizontally oriented, first upper pivot axis; a lower arm having a proximal end, a distal end, and a longitudinal axis; the proximal end of the lower arm being pivotally connected to the distal end of the second connecting element to pivot about a transversely and horizontally oriented, second upper pivot axis; a lift end element having a transversely and horizontally oriented first lower axis and a transversely and horizontally oriented second lower axis, the lift end element being pivotally connected to the distal end of the upper arm wherein the upper arm is pivotal about the first lower axis, and being pivotally connected to the distal end of the lower arm wherein the lower arm is pivotal about the second lower axis; and wherein the longitudinal axis of the upper arm is spaced parallel to the longitudinal axis of the lower arm; power means enabling selective control of a spacing between the first upper pivot axis and the second lower pivot axis, the power means being structured to displace the tow lift apparatus to and from a loading configuration and a transporting configuration; and a power source for providing electrical energy to the power means.

The connecting mechanism includes a crossbar element secured to the lift end element and having a transversely and horizontally oriented base element having a first connecting end, a second connecting end, and a longitudinal axis; a first end element having a proximal end, a distal end, and a longitudinal axis coinciding with the longitudinal axis of the base element; the proximal end thereof being slidably, telescopically, non-rotatably, and releasably receivable by the first connecting end of the base element; and a second end element having a proximal end, a distal end, and a longitudinal axis coinciding with the longitudinal axis of the base element; the proximal end thereof being slidably, telescopically, non-rotatably, and releasably receivable by the second connecting end of the base element;

The connecting mechanism also includes a first cradle element including a first connecting device, fixedly secured to the distal end of the first end element, and a first rearwardly-extending element having a proximal end and a distal end wherein the proximal end of the first rearwardly extending element is telescopically, non-rotatably, releasably, and slidably secured to the first connecting device; and a second cradle element including a second connecting device, fixedly secured to the distal end of the second end element, and a second rearwardly-extending element having a proximal end and a distal end wherein the proximal end of the second rearwardly-extending element is telescopically, non-rotatably, releasably, and slidably secured to the second connecting device.

The tow lift apparatus also includes securing means for releasably securing a pair of opposing wheels of a vehicle to be towed to a respective one of the first and second cradle elements.

The tow lift apparatus is removably mountable on the rear of a towing vehicle, the power means is activatable to displace the connecting mechanism to a loading configuration whereat the connecting mechanism is spaced in close proximity to, or in abutting engagement with, an underlying surface wherein the pair of opposing wheels of the vehicle to be towed can be releasably secured to the first and second cradle elements, whereupon the power means is again activatable to displace the connecting mechanism to a transporting configuration whereat the pair of opposing wheels of the vehicle to be towed are lifted substantially clear of the underlying surface, the vehicle to be towed then being in an attitude to be towed by the towing vehicle.

A method of assembling and using to tow lift apparatus is provided.

BRIEF DESCRIPTION OF THE DRAWINGS

FIG. 1 is side elevational view of a tow lift apparatus in use, in accordance with the present invention.

FIG. 2 is a side elevational view showing the tow lift apparatus in a transporting configuration.

FIG. 3 is a side elevational view showing the tow lift apparatus in a loading configuration.

FIG. 4 is a fragmentary, side elevational view showing a winch and cable being used for a lift means of the tow lift apparatus.

FIG. 6 is a fragmentary and vertical cross-sectional view of the tow lift apparatus taken along line 6-6 of FIG. 5.

FIG. 7 is a fragmentary and vertical cross-sectional view of a toe element of the first cradle element of the tow lift apparatus, taken along line 7-7 of FIG. 5.

FIGS. 9A, 9B and 10 are flow diagrams of a method of assembling and using the tow lift apparatus of the present invention.

DETAILED DESCRIPTION OF THE INVENTION

Figure 5:
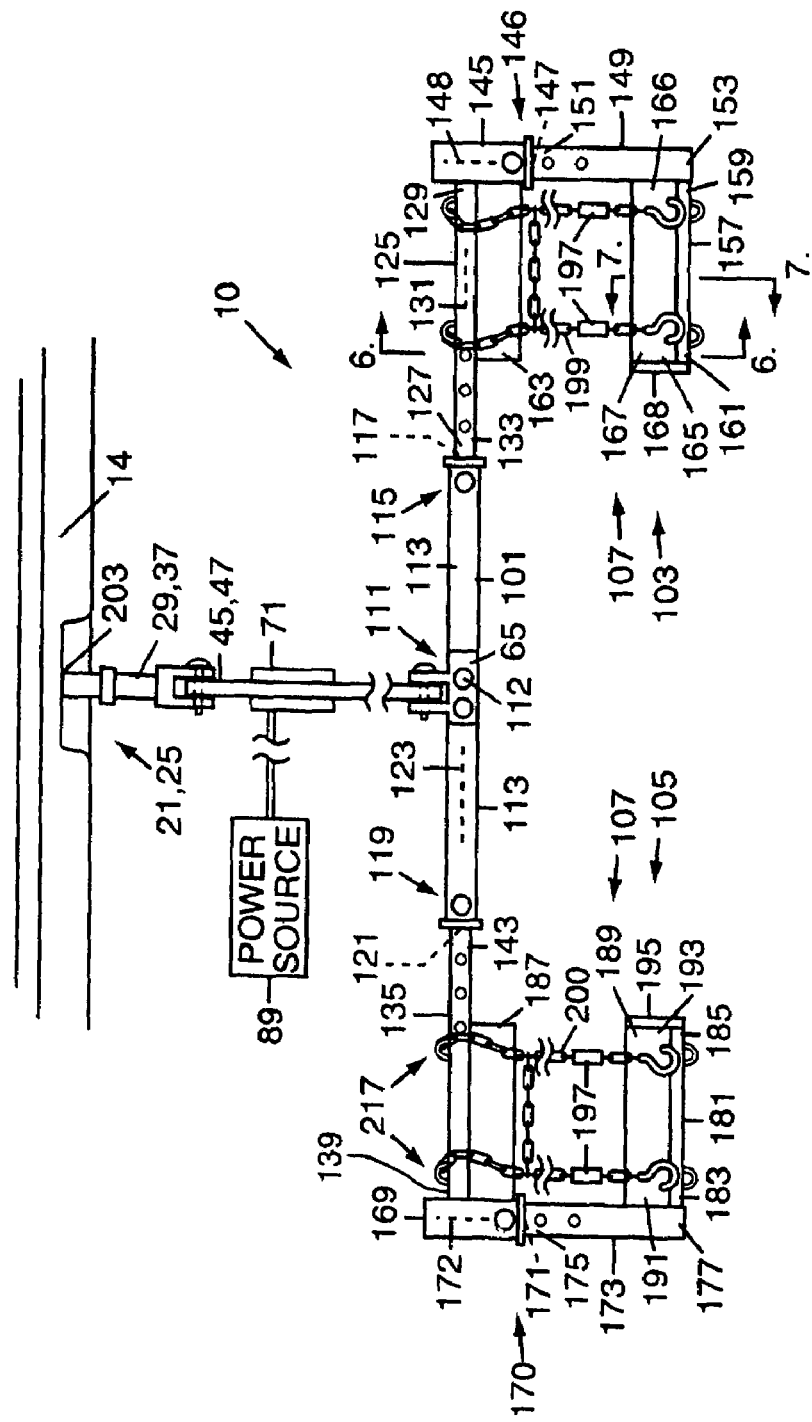
FIG. 5 is a top plan view of the tow lift apparatus.
Figure 8:
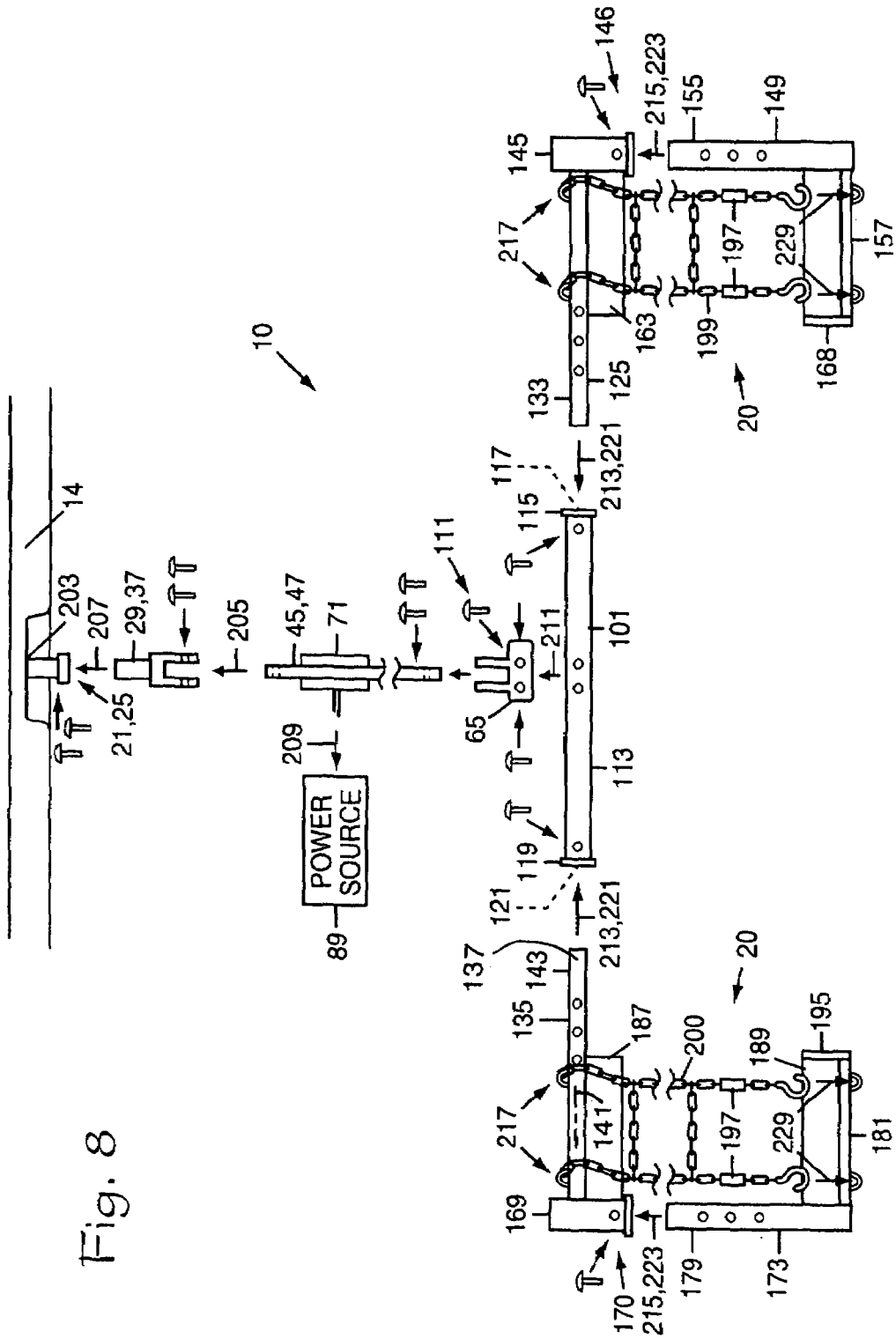
FIG. 8 is an exploded top plan view of the tow lift apparatus, in accordance with the present invention.

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a tow lift apparatus for towing a vehicle to be towed 12 behind a towing vehicle 14 in accordance with the present invention, as shown in FIGS. 1 through 10. The tow lift apparatus 10 includes lift means 17, power means 18, a connecting mechanism 19, and securing means 20.

The lift means 17 includes a first receiver hitch 21 having a fore-to-aft and horizontally oriented longitudinal axis 23 and is fixedly secured to the towing vehicle 14 at a rear end thereof. The lift means 17 also includes a second receiver hitch 25 having a fore-to-aft and horizontally oriented longitudinal axis 27 and is fixedly secured to the towing vehicle 14 at the rear end thereof and spaced vertically below the first receiver hitch 21.

The lift means 17 further includes a first connecting element 29 having a longitudinal axis 31, a proximal end 33, and a distal end 35. The proximal end 33 of the first connecting element 29 is dimensioned to be slidably and telescopically receivable by the first receiver hitch 21 wherein the longitudinal axis 31 of the first connecting element 29 coincides with the longitudinal axis 23 of the first receiver hitch 21. The lift means 17 also includes a second connecting element 37 having a longitudinal axis 39, a proximal end 41, and a distal end 43. The proximal end 41 of the second connecting element 37 is dimensioned to be slidably and telescopically receivable by the second receiver hitch 25 wherein the longitudinal axis 39 of the second connecting element 37 coincides with the longitudinal axis 27 of the second receiver hitch 25.

Yet further, the lift means 17 includes an upper arm 45 having a proximal end 47, a distal end 49, and a longitudinal axis 51. The proximal end 47 of the upper arm 45 is pivotally connected to the distal end 35 of the first connecting element 29 to pivot about a transversely and horizontally oriented, first upper pivot axis 53. The lift means 17 also includes a lower arm 55 having a proximal end 57, a distal end 59, and a longitudinal axis 61. The proximal end 57 of the lower arm 55 is pivotally connected to the distal end 43 of the second connecting element 37 to pivot about a transversely and horizontally oriented, second upper pivot axis 63.

A lift end element 65 includes a transversely and horizontally oriented first lower pivot axis 67 and a transversely and horizontally oriented second lower pivot axis 69. The lift end element 65 is pivotally connected to the distal end 49 of the upper arm 45 wherein the upper arm 45 is pivotal about the first lower pivot axis 67, and is pivotally connected to the distal end 59 of the lower arm 55 wherein the lower arm 55 is pivotal about the second lower pivot axis 69. The longitudinal axis 51 of the upper arm 45 is spaced parallel to the longitudinal axis 61 of the lower arm 55. In other words, the upper and lower arms 45, 55 in combination with the lift end element 65 and the first and second connecting elements 29, 37 form a parallelogram.

The power means 18 enables selective control by a user of a spacing between the first upper pivot axis 53 and the second lower pivot axis 69. The power means 18 may include a hydraulic ram 71 having a first ram end 73 pivotally connected to the first connecting element 29 in close proximity to the first upper pivot axis 53, and a second ram end 75 pivotally connected to the lift end element 65 in close proximity to the second lower pivot axis 69. The power means 18 is structured to displace the tow lift apparatus 10 to and from a loading configuration 79 as shown in FIG. 3, and a transporting configuration 77 as shown in FIGS. 1 and 2.

Alternatively, the power means 18 may include a fixedly mounted, motorized reel-type hoist 81 wherein the hoist 81 includes a retractable cable 83 with a cable end 85. The cable end 85 is attached to the lift end element 65 in close proximity to the second lower pivot axis 69 with the cable 83 being entrained in close proximity to the first upper pivot axis 53.

It is to be understood that a motor and worm gear arrangement may be used for the power means 18 of the present invention, which is intended to be within the scope of the present invention.

A locking mechanism 87 is structured to releasably and positively lock the tow lift apparatus 10 in the transporting configuration 77, such as a rigid bar 88 securely and releasably attached to the upper and lower arms 45, 55 as shown in FIG. 2 or to the first connecting element 29 and the lift end element 65, or other suitable arrangement.

A power source 89 supplies electrical energy to the power mean s. For example, the power source 89 may include a connection to an electrical system of the towing vehicle 14. Alternatively, the power source 89 may include a battery fixedly secured to the tow lift apparatus 10, as schematically indicated by dashed lines designated by numeral 91 in FIGS. 3 and 4.

The connecting mechanism 19 includes a crossbar element 101, a first cradle element 103, a second cradle element 105, and securing means 107.

The crossbar element 101 is pivotally secured to the lift end element 65 wherein the crossbar element 101 is pivotal about a vertically oriented axis 109 relative to the lift end element 65. The crossbar element 101 includes a releasable lock 111 structured to selectively prevent the crossbar element 101 from pivoting about the vertically oriented axis 109 relative to the lift end element 65, such as a pin 112 insertable through alignable bores through the lift end element 65 and the crossbar element 101 as shown in FIG. 5.

The crossbar element 101 includes a transversely and horizontally oriented base element 113 having a first connecting end 115 with an inner square-shaped cross-section 117, a second connecting end 119 with an inner square-shaped cross-section 121, and a longitudinal axis 123. For example, the first and second connecting ends 115, 119 may be similar to entry portions of square-shaped conventional receiver hitches.

The crossbar element 101 also includes a first end element 125 having a proximal end 127, a distal end 129, and a longitudinal axis 131 coinciding with the longitudinal axis 123 of the base element 113. The proximal end 127 of the first end element 125 includes an outer square-shaped cross-section 133 dimensioned to mate with the inner square-shaped cross-section 117 of the first connecting end 115, wherein the proximal end 127 of the first end element 125 is slidably, telescopically, non-rotatably, and releasably receivable by the first connecting end 115 of the base element 113.

The crossbar element 101 further includes a second end element 135 having a proximal end 137, a distal end 139, and a longitudinal axis 141 coinciding with the longitudinal axis 123 of the base element 113. The proximal end 137 of the second end element 135 includes an outer square-shaped cross-section 143 dimensioned to mate with the inner square-shaped cross-section 121 of the second connecting end 119, wherein the proximal end 137 of the second end element 135 is slidably, telescopically, non-rotatably, and releasably receivable by the second connecting end 119 of the base element 113.

The first cradle element 103 includes a first connecting device 145 having a first securing mechanism 146 with an inner square-shaped cross-section 147. For example, the first securing mechanism 146 may be similar to an entry portion of a square-shaped conventional receiver hitch. The first connecting device 145 is fixedly secured to the distal end 129 of the first end element 125 wherein a longitudinal axis 148 thereof has a horizontal and fore-to-aft orientation.

The first cradle element 103 includes a first rearwardly-extending element 149 having a proximal end 151 and a distal end 153. The proximal end 151 has an outer square-shaped cross-section 155 dimensioned to mate with the inner square-shaped cross-section 147 of the first connecting device 145 wherein the proximal end 151 of the first rearwardly-extending element 149 is telescopically, non-rotatably, releasably, and slidably secured to the first connecting device 145. A first transverse support element 157 has a proximal end 159 and a distal end 161. The proximal end 159 of the first transverse support element 157 is fixedly secured to the distal end 153 of the first rearwardly-extending element 149 and extends transversely and horizontally inwardly, as shown in FIG. 5.

The first cradle element 103 also includes a first front wheel support 163 fixedly secured to the first end element 125 of the crossbar element 101 and to the first connecting device 145 wherein the first front wheel support 163 slopes downwardly and rearwardly from the first end element 125, as shown in FIG. 6. A first rear wheel support 165 has a proximal end 166 and a distal end 167. The proximal end 166 of the first rear wheel support 165 is fixedly secured to the distal end 153 of the first rearwardly-extending element 149 and to the first transverse support element 157 wherein the first rear wheel support 165 slopes downwardly and forwardly from the first transverse support element 157, as shown in FIG. 7. A fore-to-aft and vertically oriented first toe element 168 is fixedly secured to the distal end 161 of the first transverse support element 157 and to the distal end 167 of the first rear wheel support 165.

The second cradle element 105 includes a second connecting device 169 having a second securing mechanism 170 with an inner square-shaped cross-section 171. For example, the second securing mechanism 170 may be similar to an entry portion of a square-shaped conventional receiver hitch. The second connecting device 169 is fixedly secured to the distal end 139 of the second end element 135 wherein a longitudinal axis 172 thereof has a horizontal and fore-to-aft orientation.

The second cradle element 105 also includes a second rearwardly-extending element 173 having a proximal end 175 and a distal end 177. The proximal end 175 has an outer square-shaped cross-section 179 dimensioned to mate with the inner square-shaped cross-section 171 of the second connecting device 169 wherein the second rearwardly-extending element 173 is telescopically, non-rotatably, releasably, and slidably secured to the second connecting device 169. A second transverse support element 181 has a proximal end 183 and a distal end 185 wherein the proximal end of the second transverse support element 181 is fixedly secured to the distal end 177 of the second rearwardly-extending element 173 and extends transversely and horizontally inwardly toward the first transverse support element 157, as shown in FIG. 5.

A second front wheel support 187 is fixedly secured to the second end element 135 of the crossbar element 101 and to the second connecting device 169 wherein the second front wheel support 187 slopes downwardly and rearwardly from the second end element 135, as hereinbefore similarly described for the first front wheel support 163. A second rear wheel support 189 has a proximal end 191 and a distal end 193. The proximal end 191 of the second rear wheel support 189 is fixedly secured to the distal end 177 of the second rearwardly-extending element 173 and to the second transverse support element 181 wherein the second rear wheel support 189 slopes downwardly and forwardly from the second transverse support element 181, as hereinbefore similarly described for the first rear wheel support 165. A fore-to-aft and vertically oriented second toe element 195 is fixedly secured to the distal end 185 of the second transverse support element 181 and to the distal end 193 of the second rear wheel support 189. The first and second toe elements 168, 195 are structured to prevent the wheels of a vehicle 12 from sliding off the respective first and second rear wheel supports 165, 189 as the vehicle 12 is being towed.

The securing means 20 is structured to releasably secure a pair of opposing wheels 198 of a vehicle to be towed 12 to a respective one of the first and second cradle elements 103, 105, the securing means 20 including a pair of tie-down harnesses 199, 200, one of the pair of tie-down harnesses being securable between the first end element 125 and the first transverse support element 157 in order to releasably and securely clamp one of the pair of opposing wheels 198 of the vehicle to be towed 12 in abutting engagement with the first front and rear wheel supports 163, 165, and the other one of the pair of tie-down harnesses being securable between the second end element 135 and the second transverse support element 181 in order to releasably and securely clamp the other one of the pair of opposing wheels 198 of the vehicle to be towed 12 in abutting engagement with the second front and rear wheel supports 187, 189. Preferably, the tie-down harnesses 199, 200 include turnbuckles 197 for more securely clamping the pair of opposing wheels 198 to the first and second cradle elements 103, 105.

The tow lift apparatus 10 is structured to be removably mountable on the rear end of a towing vehicle 14 wherein the power means 18 is activatable to displace the connecting mechanism 19 to the loading configuration 79 whereat the connecting mechanism 19 is spaced in close proximity to, or in abutting engagement with, an underlying surface as shown in FIG. 3, wherein the pair of opposing wheels 198 of the vehicle to be towed 12 can be releasably secured to the first and second cradle elements 103, 105, whereupon the power means 18 is again activatable to displace the connecting mechanism 19 to the transporting configuration 77 whereat the pair of opposing wheels 198 of the vehicle to be towed 12 are lifted substantially clear of the underlying surface as shown in FIG. 2, the vehicle to be towed 12 then being in an attitude to be towed by the towing vehicle 14.

Figure 9B:
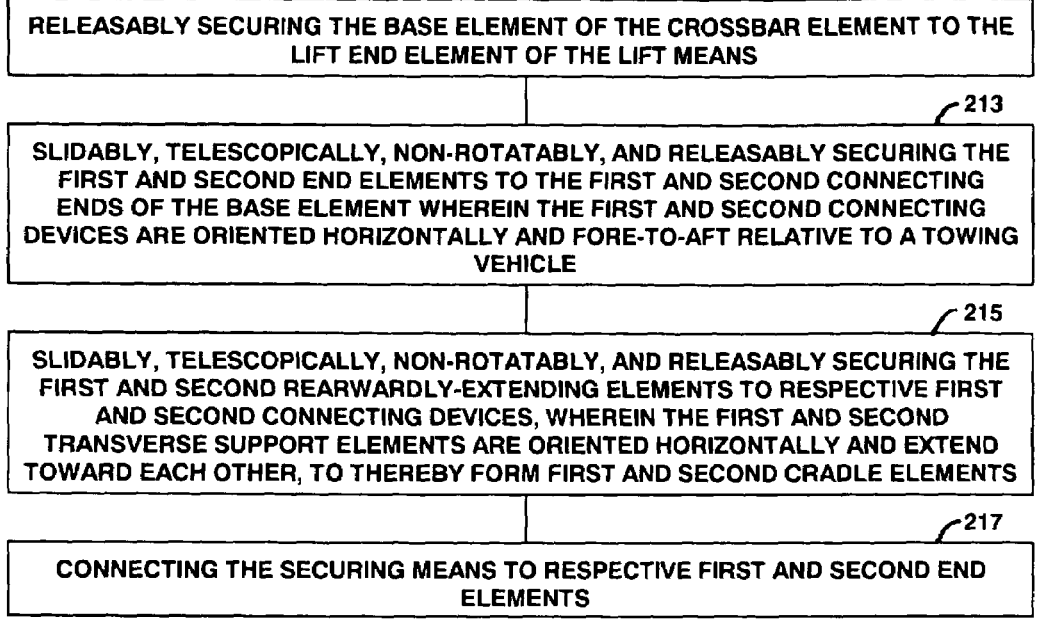

In an application of the tow lift apparatus 10 of the present invention wherein the tow lift apparatus 10 is disassembled into separated parts 201, the tow lift apparatus is assembled as follows and as shown in FIGS. 9A and 9B:

fixedly securing the first and second receiver hitches to the rear end of a towing vehicle wherein axes thereof are aligned vertically from each other and are oriented horizontally and fore-to-aft relative to the towing vehicle 203;

securing the lift means to the first and second connecting elements 205;

releasably securing the first and second connecting elements to the first and second receiver hitches 207;

connecting the power means to a power source 209;

releasably securing the base element of the crossbar element to the lift end element of the lift means 211;

slidably, telescopically, non-rotatably, and releasably securing the first and second end elements to the first and second connecting ends of the base element wherein the first and second connecting devices are oriented horizontally and fore-to-aft relative to a towing vehicle 213;

slidably, telescopically, non-rotatably, and releasably securing the first and second rearwardly-extending elements to respective first and second connecting devices, wherein the first and second transverse support elements are oriented horizontally and extend toward each other, to thereby form the first and second cradle elements 215; and connecting the securing means to respective first and second end elements 217.

Figure 10:
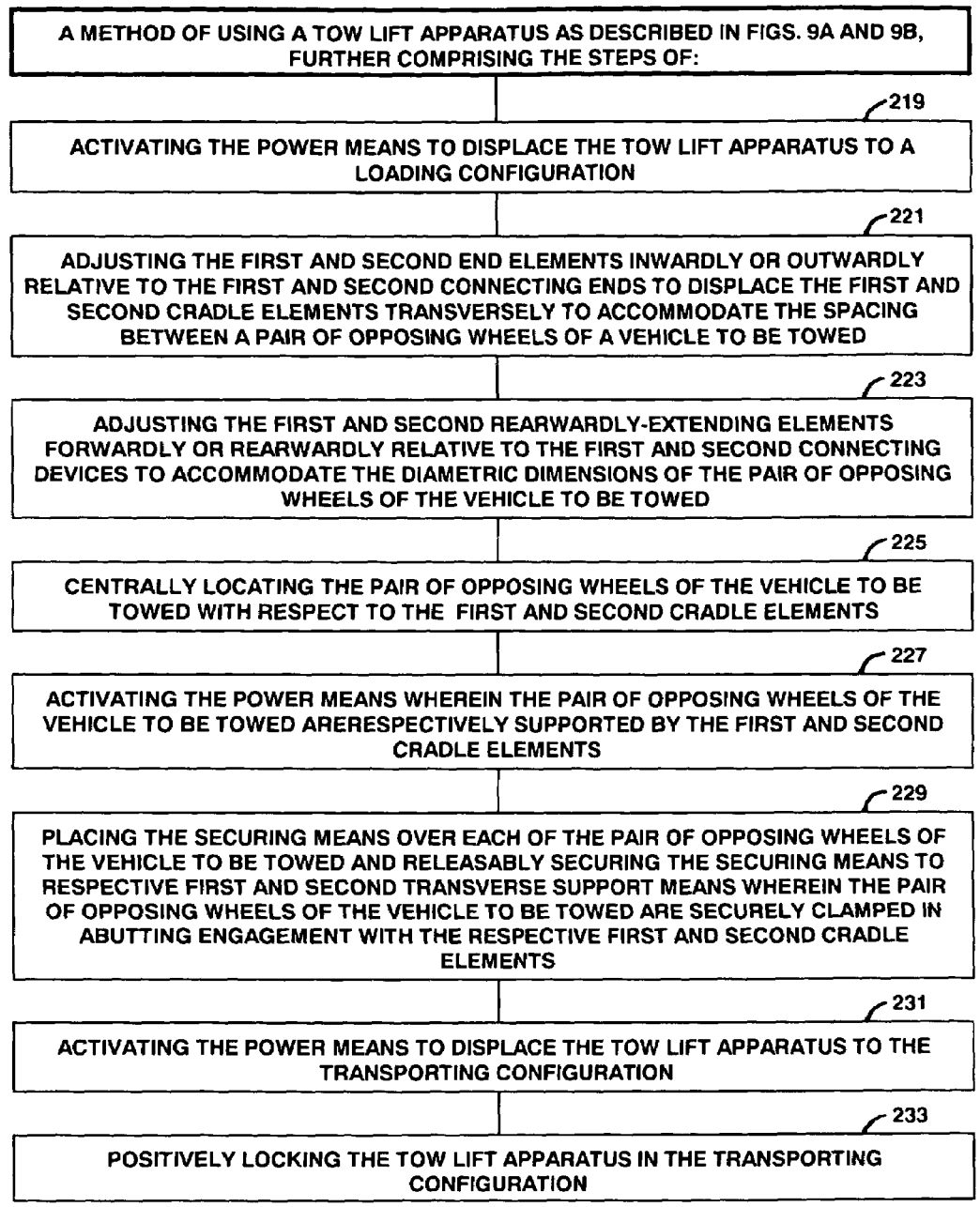

The tow lift apparatus 10 can then be used as follows and as shown in FIG. 10:

activating the power means to displace the tow lift apparatus to a loading configuration 219, as shown in FIG. 3;

adjusting the first and second end elements inwardly or outwardly relative to the first and second connecting ends to displace the first and second cradle elements transversely to accommodate the spacing between a pair of opposing wheels of a vehicle to be towed 221;

adjusting the first and second rearwardly-extending elements forwardly or rearwardly relative to the first and second connecting devices to accommodate the diametric dimensions of the pair of opposing wheels of the vehicle to be towed 223;

centrally locating the pair of opposing wheels of the vehicle to be towed with respect to the first and second cradle elements 225;

activating the power means wherein the pair of opposing wheels of the vehicle to be towed are respectively supported by the first and second cradle elements 227;

placing the securing means over each of the pair of opposing wheels of the vehicle to be towed and releasably securing the securing means to respective first and second transverse support means wherein the pair of opposing wheels of the vehicle to be towed are securely clamped in abutting engagement with the respective first and second cradle elements 229;

activating the power means to displace the tow lift apparatus to the transporting configuration 231; and positively locking the tow lift apparatus in the transporting configuration 233, see for example the rigid bar 88 in FIG. 2.

The towed vehicle can then be unloaded from the tow lift apparatus 10 by reversing the foregoing steps for using the tow lift apparatus 10. Similarly, the tow lift apparatus 10 can then be disassembled for storage or for transporting purposes by reversing the aforedescribed steps for assembling the tow lift apparatus 10.

Based on the foregoing disclosure, it should be obvious to a person having ordinary skill in the relevant art that the tow lift apparatus 10 of the present invention with its two vertically aligned conventional receiver hitches has substantially greater stability than similar prior art equipment secured to only one conventional receiver hitch, while still being easily releasable for disassembly and storage, and being portably transferable from towing vehicle to towing vehicle.

Preferably, the tow lift apparatus 10 also includes attachment means for releasably connecting the tow lift apparatus 10 to the towing vehicle with a pair of safety chains as required by most state laws.

It is to be understood that while certain forms of the present invention have been illustrated and described herein, it is not to be limited to the specific forms or arrangement of parts as described and shown.

What is claimed and desired to be covered by Letters Patent is as follows:

1. A tow lift apparatus for towing a vehicle to be towed behind a towing vehicle, comprising:
    (a) lift means including:
        (1) a first receiver hitch having a fore-to-aft and horizontally oriented longitudinal axis, the first receiver hitch being fixedly secured to the towing vehicle at a rear end thereof,
        (2) a second receiver hitch having a fore-to-aft and horizontally oriented longitudinal axis, the second receiver hitch being fixedly secured to the towing vehicle at the rear end thereof and spaced vertically below the first receiver hitch, (3) a first connecting element having a longitudinal axis, a proximal end, and a distal end; the proximal end of the first connecting element being slidably and telescopically receivable by the first receiver hitch wherein the longitudinal axis of the first connecting element coincides with the longitudinal axis of the first receiver hitch, (4) a second connecting element having a longitudinal axis, a proximal end, and a distal end; the distal end of the second connecting element being slidably and telescopically receivable by the second receiver hitch wherein the longitudinal axis of the second connecting element coincides with the longitudinal axis of the second receiver hitch, (5) an upper arm having a proximal end, a distal end, and a longitudinal axis; the proximal end of the upper arm being pivotally connected to the distal end of the first connecting element to pivot about a transversely and horizontally oriented, first upper pivot axis, (6) a lower arm having a proximal end, a distal end, and a longitudinal axis; the proximal end of the lower arm being pivotally connected to the distal end of the second connecting element to pivot about a transversely and horizontally oriented, second upper pivot axis, (7) a lift end element having a transversely and horizontally oriented first lower axis and a transversely and horizontally oriented second lower axis, the lift end element being pivotally connected to the distal end of the upper arm wherein the upper arm is pivotal about the first lower axis, and being pivotally connected to the distal end of the lower arm wherein the lower arm is pivotal about the second lower axis; and wherein the longitudinal axis of the upper arm is spaced parallel to the longitudinal axis of the lower arm;

(8) power means enabling selective control of a spacing between the first upper pivot axis and the second lower pivot axis, the power means being structured to displace the tow lift apparatus to and from a loading configuration and a transporting configuration; and (9) a power source for providing electrical energy to the power means;

(b) a connecting mechanism including:

(1) a crossbar element secured to the lift end element and having:

(A) a transversely and horizontally oriented base element having a first connecting end, a second connecting end, and a longitudinal axis;

(B) a first end element having a proximal end, a distal end, and a longitudinal axis coinciding with the longitudinal axis of the base element; the proximal end thereof being slidably, telescopically, non-rotatably, and releasably receivable by the first connecting end of the base element; and (C) a second end element having a proximal end, a distal end, and a longitudinal axis coinciding with the longitudinal axis of the base element; the proximal end thereof being slidably, telescopically, non-rotatably, and releasably receivable by the second connecting end of the base element;

(2) a first cradle element including a first connecting device, fixedly secured to the distal end of the first end element, and a first rearwardly-extending element having a proximal end and a distal end wherein the proximal end of the first rearwardly extending element is telescopically, non-rotatably, releasably, and slidably secured to the first connecting device;

(3) a second cradle element including a second connecting device, fixedly secured to the distal end of the second end element, and a second rearwardly-extending element having a proximal end and a distal end wherein the proximal end of the second rearwardly-extending element is telescopically, non-rotatably, releasably, and slidably secured to the second connecting device; and (c) securing means for releasably securing a pair of opposing wheels of a vehicle to be towed to a respective one of the first and second cradle elements; and (d) wherein the tow lift apparatus is removably mountable on the rear of a towing vehicle, the power means is activatable to displace the connecting mechanism to a loading configuration whereat the connecting mechanism is spaced in close proximity to, or in abutting engagement with, an underlying surface wherein the pair of opposing wheels of the vehicle to be towed can be releasably secured to the first and second cradle elements, whereupon the power means is again activatable to displace the connecting mechanism to a transporting configuration whereat the pair of opposing wheels of the vehicle to be towed are lifted substantially clear of the underlying surface, the vehicle to be towed then being in an attitude to be towed by the towing vehicle.

2. A tow lift apparatus as described in claim 1, wherein the power means includes a hydraulic ram having a first ram end pivotally connected to the first connecting element in close proximity to the first upper pivot axis, and a second ram end pivotally connected to the lift end element in close proximity to the second lower pivot axis.

3. A tow lift apparatus as described in claim 1, wherein the power means includes a reel-type hoist fixedly mounted to the first connecting element, the hoist having a retractable cable with a cable end with the cable end being releasably attachable to the lift end element in close proximity to the second lower pivot axis with the cable being entrained in closed proximity to the first upper pivot axis.

4. A tow lift apparatus as described in claim 1, further comprising a transporting lock structured to releasably and positively lock the tow lift apparatus in the transporting configuration.

5. A tow lift apparatus as described in claim 1, wherein the power source includes a battery secured to the tow lift apparatus.

6. A tow lift apparatus as described in claim 1, wherein the power source includes an electrical connection to an electrical system of the towing vehicle.

7. A tow lift apparatus as described in claim 1, wherein the crossbar element is fixedly secured to the lift end element.

8. A tow lift apparatus as described in claim 1, wherein the crossbar element is pivotally secured to the lift end element wherein the crossbar element is pivotal about a vertically oriented axis relative to the lift end element.

9. A tow lift apparatus as described in claim 8, further comprising a releasable lock structured to selectively prevent the crossbar element from pivoting about the vertically oriented axis relative to the lift end element.

10. A tow lift apparatus as described in claim 1, wherein:
(a) each of the first and second connecting ends of the crossbar element includes an inner square-shaped cross-section; and
(b) each of the first and second end elements includes an outer square-shaped cross-section dimensioned to mate with a respective one of the inner square-shaped cross-sections of the first and second connecting ends.

11. A tow lift apparatus as described in claim 1, wherein:
(a) each of the first and second connecting devices of the first and second cradle elements includes an inner square-shaped cross-section; and
(b) each of the first and second rearwardly-extending elements includes an outer square-shaped cross-section dimensioned to mate with a respective one of the inner square-shaped cross-sections of the first and second connecting devices.

12. A tow lift apparatus as described in claim 1, further comprising first and second transverse support elements, each having a proximal end and a distal end, wherein the proximal ends of the first and second transverse support elements are fixedly secured to the distal end of a respective one of the first and second rearwardly-extending elements and extending transversely and horizontally inwardly toward the other one of the first and second transverse support elements.

13. A tow lift apparatus as described in claim 12, wherein the connecting mechanism further includes:
(a) first and second front wheel supports wherein the first front wheel support is fixedly secured to the first end element of the crossbar element and to the first connecting device with the first front wheel support sloping downwardly and rearwardly from the first end element, and the second front wheel support is fixedly secured to the second end element of the crossbar element and to the second connecting device with the second front wheel support sloping downwardly and rearwardly from the second end element; and
(b) first and second rear wheel supports, each having a proximal end and a distal end, wherein the first rear wheel support is fixedly secured to the distal end of the first rearwardly-extending element and to the first transverse support element with the first rear wheel support sloping downwardly and forwardly from the first transverse support element, and the second rear wheel support is fixedly secured to the distal end of the second rearwardly-extending element and to the second transverse support element with the second rear wheel support sloping downwardly and forwardly from the second transverse support element.

14. A tow lift apparatus as described in claim 13, further comprising first and second fore-to-aft and vertically oriented toe elements, the first toe element being fixedly secured to the distal ends of the first transverse rear wheel and first rear wheel supports, and the second toe element being fixedly secured to the distal ends of the second transverse rear wheel and second rear wheel supports.

15. A tow lift apparatus as described in claim 13, wherein the securing means includes a pair of tie-down harnesses, one of the pair of tie-down harnesses releasably securable between the first end element and the first transverse support element to thereby releasably and securely clamp one of a pair of opposing wheels of a vehicle to be towed in abutting engagement with the first front and rear wheel supports, and the other one of the pair of tie-down harnesses releasably securable between the second end element and the second transverse support element to thereby releasably and securely clamp the other one of the pair of opposing wheels of the vehicle to be towed in abutting engagement with the second front and rear wheel supports.

16. A tow lift apparatus for towing a vehicle to be towed behind a towing vehicle, comprising:
(a) lift means including:
(1) a first receiver hitch having a fore-to-aft and horizontally oriented longitudinal axis, the first receiver hitch being fixedly secured to the towing vehicle at a rear end thereof,
(2) a second receiver hitch having a fore-to-aft and horizontally oriented longitudinal axis, the second receiver hitch being fixedly secured to the towing vehicle at the rear end thereof and spaced vertically below the first receiver hitch,
(3) a first connecting element having a longitudinal axis, a proximal end, and a distal end; the proximal end of the first connecting element being slidably and telescopically receivable by the first receiver hitch wherein the longitudinal axis of the first connecting element coincides with the longitudinal axis of the first receiver hitch,
(4) a second connecting element having a longitudinal axis, a proximal end, and a distal end; the proximal end of the second connecting element being slidably and telescopically receivable by the second receiver hitch wherein the longitudinal axis of the second connecting element coincides with the longitudinal axis of the second receiver hitch,
(5) an upper arm having a proximal end, a distal end, and a longitudinal axis; the proximal end of the upper arm being pivotally connected to the distal end of the first connecting element to pivot about a transversely and horizontally oriented, first upper pivot axis,
(6) a lower arm having a proximal end, a distal end, and a longitudinal axis; the proximal end of the lower arm being pivotally connected to the distal end of the second connecting element to pivot about a transversely and horizontally oriented, second upper pivot axis,
(7) a lift end element having a transversely and horizontally oriented first lower axis and a transversely and horizontally oriented second lower axis, the lift end element being pivotally connected to the distal end of the upper arm wherein the upper arm is pivotal about the first lower axis, and being pivotally connected to the distal end of the lower arm wherein the lower arm is pivotal about the second lower axis; and wherein the longitudinal axis of the upper arm is spaced parallel to the longitudinal axis of the lower arm;
(8) power means enabling selective control of a spacing between the first upper pivot axis and the second lower pivot axis, the power means including a hydraulic ram having a first ram end pivotally connected to the first connecting element in close proximity to the first upper pivot axis, and a second ram end pivotally connected to the lift end element in close proximity to the second lower pivot axis; the power means being structured to displace the tow lift apparatus to and from a loading configuration and a transporting configuration;
(9) a transporting lock structured to releasably and positively lock the tow lift apparatus in the transporting configuration; and

(10) a power source for providing electrical energy to the power means;

(b) a connecting mechanism including:

(1) a crossbar element pivotally secured to the lift end element wherein the crossbar element is pivotal about a vertically oriented axis relative to the lift end element, the crossbar element including:

(A) a releasable lock structured to selectively prevent the crossbar element from pivoting about the vertically oriented axis relative to the lift end element, (B) a transversely and horizontally oriented base element having a first connecting end with an inner square-shaped cross-section, a second connecting end with an inner square-shaped cross-section, and a longitudinal axis;

(C) a first end element having a proximal end, a distal end, and a longitudinal axis coinciding with the longitudinal axis of the base element; the proximal end of the first end element having an outer square-shaped cross-section dimensioned to mate with the inner square-shaped cross-section of the first connecting end, the proximal end of the first end element being slidably, telescopically, non-rotatably, and releasably receivable by the first connecting end of the base element; and (D) a second end element having a proximal end, a distal end, and a longitudinal axis coinciding with the longitudinal axis of the base element; the proximal end of the second end element having an outer square-shaped cross-section dimensioned to mate with the inner square-shaped cross-section of the second connecting end, the proximal end of the second end element being slidably, telescopically, non-rotatably, and releasably receivable by the second connecting end of the base element;

(2) a first cradle element including:

(A) a first connecting device having an inner square-shaped cross-section, the first connecting device being fixedly secured to the distal end of the first end element, (B) a first rearwardly-extending element having a proximal end and a distal end, the proximal end having an outer square-shaped cross-section dimensioned to mate with the inner square-shaped cross-section of the first connecting device wherein the proximal end of the first rearwardly-extending element is telescopically, non-rotatably, releasably, and slidably secured to the first connecting device, (C) a first transverse support element having a proximal end and a distal end, the proximal end of the first transverse support element being fixedly secured to the distal end of the first rearwardly-extending element and extending transversely and horizontally inwardly, (D) a first front wheel support fixedly secured to the first end element of the crossbar element and to the first connecting device wherein the first front wheel support slopes downwardly and rearwardly from the first end element, (E) a first rear wheel support having a proximal end and a distal end, the proximal end of the first rear wheel support being fixedly secured to the distal end of the first rearwardly-extending element and to the first transverse support element wherein the first rear wheel support slopes downwardly and forwardly from the first transverse support element, and (F) a fore-to-aft and vertically oriented first toe element fixedly secured to the distal end of the first transverse support element and to the distal end of the first rear wheel support;

(3) a second cradle element including:

(A) a second connecting device having an inner square-shaped cross-section, the second connecting device being fixedly secured to the distal end of the second end element, (B) a second rearwardly-extending element having a proximal end and a distal end, the proximal end having an outer square-shaped cross-section dimensioned to mate with the inner square-shaped cross-section of the second connecting device wherein the second rearwardly-extending element is telescopically, non-rotatably, releasably, and slidably secured to the second connecting device, (C) a second transverse support element having a proximal end and a distal end, the proximal end of the second transverse support element being fixedly secured to the distal end of the second rearwardly-extending element and extending transversely and horizontally inwardly toward the first transverse support element, (D) a second front wheel support fixedly secured to the second end element of the crossbar element and to the second connecting device wherein the second front wheel support slopes downwardly and rearwardly from the second end element, (E) a second rear wheel support having a proximal end and a distal end, the proximal end of the second rear wheel support being fixedly secured to the distal end of the second rearwardly-extending element and to the second transverse support element wherein the second rear wheel support slopes downwardly and forwardly from the second transverse support element, and (F) a fore-to-aft and vertically oriented second toe element fixedly secured to the distal end of the second transverse support element and to the distal end of the second rear wheel support; and (c) securing means for releasably securing a pair of opposing wheels of a vehicle to be towed to a respective one of the first and second cradle elements, the securing means including a pair of tie-down harnesses, one of the pair of tie-down harnesses being securable between the first end element and the first transverse support element in order to releasably and securely clamp one of the pair of opposing wheels of the vehicle to be towed in abutting engagement with the first front and rear wheel supports, and the other one of the pair of tie-down harnesses being securable between the second end element and the second transverse support element in order to releasably and securely clamp the other one of the pair of opposing wheels of the vehicle to be towed in abutting engagement with the second front and rear wheel supports; and (d) wherein the tow lift apparatus is removably mountable on the rear of a towing vehicle, the power means is activatable to displace the connecting mechanism to the loading configuration whereat the connecting mechanism is spaced in close proximity to, or in abutting engagement with, an underlying surface wherein the pair of opposing wheels of the vehicle to be towed can be releasably secured to the first and second cradle elements, whereupon the power means is again activatable to displace the connecting mechanism to the transporting configuration whereat the pair of opposing wheels of the vehicle to be towed are lifted substantially clear of the underlying surface, the vehicle to be towed then being in an attitude to be towed by the towing vehicle.

17. A method of assembling and using a tow lift apparatus, comprising the steps of:
   (a) providing a tow lift apparatus having separated parts as follows:
      (1) first and second receiver hitches,
      (2) first and second connecting elements,
      (3) lift means having upper and lower arms, power means, and a lift end element,
      (4) a crossbar element having a base element with first and second connecting ends,
      (5) a locking mechanism for positively locking the tow lift apparatus in a transporting configuration,
      (6) first and second end elements having first and second connecting devices and first and second front wheel supports fixedly secured to respective distal ends thereof,
      (7) first and second rearwardly-extending elements having first and second transverse support elements, first and second rear wheel supports, and first and second toe elements fixedly secured to respective distal ends thereof, and
      (8) securing means;
   (b) fixedly securing the first and second receiver hitches to the rear end of a towing vehicle wherein axes thereof are aligned vertically from each other and are oriented horizontally and fore-to-aft relative to the towing vehicle;
   (c) securing the lift means to the first and second connecting elements;
   (d) releasably securing the first and second connecting elements to the first and second receiver hitches;
   (e) connecting the power means to a power source;
   (f) releasably securing the base element of the crossbar element to the lift end element of the lift means;
   (g) slidably, telescopically, non-rotatably, and releasably securing the first and second end elements to the first and second connecting ends of the base element wherein the first and second connecting devices are oriented horizontally and fore-to-aft relative to a towing vehicle;
   (h) slidably, telescopically, non-rotatably, and releasably securing the first and second rearwardly-extending elements to respective first and second connecting devices, wherein the first and second transverse support elements are oriented horizontally and extend toward each other, to thereby form first and second cradle elements; and
   (i) connecting the securing means to respective first and second end elements.

18. A method of assembling and using a tow lift apparatus as described in claim 17, further comprising the steps of:
   (j) activating the power means to displace the tow lift apparatus to a loading configuration;
   (k) adjusting the first and second end elements inwardly or outwardly relative to the first and second connecting ends to displace the first and second cradle elements transversely to accommodate the spacing between a pair of opposing wheels of a vehicle to be towed;
   (l) adjusting the first and second rearwardly-extending elements forwardly or rearwardly relative to the first and second connecting devices to accommodate the diametric dimensions of the pair of opposing wheels of the vehicle to be towed;
   (m) centrally locating the pair of opposing wheels of the vehicle to be towed with respect to the first and second cradle elements;
   (n) activating the power means wherein the pair of opposing wheels of the vehicle to be towed are respectively supported by the first and second cradle elements;
   (o) placing the securing means over each of the pair of opposing wheels of the vehicle to be towed and releasably securing the securing means to respective first and second transverse support means wherein the pair of opposing wheels of the vehicle to be towed are securely clamped in abutting engagement with the respective first and second cradle elements;
   (p) activating the power means to displace the tow lift apparatus to the transporting configuration; and
   (q) positively locking the tow lift apparatus in the transporting configuration.

* * * * *